(12) United States Patent
Heath et al.

(10) Patent No.: US 11,124,197 B2
(45) Date of Patent: *Sep. 21, 2021

(54) CONTEXTUAL DRIVER BEHAVIOR MONITORING

(71) Applicant: Intelligent Imaging Systems, Inc., Edmonton (CA)

(72) Inventors: Brian Heath, Vancouver (CA); Wayne Allan Malkin, Edmonton (CA)

(73) Assignee: Intelligent Imaging Systems, Inc., Edmonton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/713,794

(22) Filed: Dec. 13, 2019

(65) Prior Publication Data

US 2020/0114928 A1    Apr. 16, 2020

Related U.S. Application Data

(63) Continuation of application No. 15/833,819, filed on Dec. 6, 2017, now Pat. No. 10,543,847, which is a
(Continued)

(51) Int. Cl.
*B60W 50/00* (2006.01)
*B60W 50/14* (2020.01)
*B60W 40/09* (2012.01)
*G08G 1/01* (2006.01)
*G08G 1/052* (2006.01)
(Continued)

(52) U.S. Cl.
CPC ........ *B60W 50/0097* (2013.01); *B60W 40/09* (2013.01); *B60W 50/14* (2013.01); *G08G 1/0112* (2013.01); *G08G 1/0129* (2013.01); *G08G 1/0141* (2013.01); *G08G 1/052* (2013.01); *G08G 1/093* (2013.01); *G08G 1/096716* (2013.01); *G08G 1/096741* (2013.01); *G08G 1/096775* (2013.01); *G08G 1/164* (2013.01); *G08G 1/20* (2013.01); *B60W 2520/10* (2013.01);
(Continued)

(58) Field of Classification Search
CPC ...... G08G 1/093; G08G 1/0129; G08G 1/205; G08G 1/0141; G08G 1/052; G08G 1/096716; G08G 1/096741; G08G 1/096775; G08G 1/09716; G08G 1/09725; G08G 1/164; G08G 1/20; B60W 50/0097; B60W 50/14; B60W 40/09
USPC ................ 340/438, 439, 441, 905; 434/236; 701/117, 408; 705/317
See application file for complete search history.

(56) References Cited

U.S. PATENT DOCUMENTS 6,501,421 B1   12/2002  Dutta et al.
6,556,905 B1   4/2003   Mittelsteadt
(Continued)

*Primary Examiner* — Kerri L McNally
(74) *Attorney, Agent, or Firm* — Seed IP Law Group LLP

(57) ABSTRACT

A database of high risk locations is formed and high risk causal factors for the high risk locations determined. Driver behavior is monitored at the sites in the database using data collection devices such as electronic logging devices or mobile phones to see if the drivers exhibit the same specific behaviors that are considered contributing factors to specific accident types at risk of occurrence at those sites. Warnings are provided to drivers approaching the specific sites to prompt behavioral changes which may further be monitored by the data collection devices.

4 Claims, 5 Drawing Sheets

Related U.S. Application Data continuation of application No. 15/250,681, filed on Aug. 29, 2016, now Pat. No. 9,849,887.

(60) Provisional application No. 62/210,986, filed on Aug. 27, 2015.

(51) Int. Cl.
  *G08G 1/0967* (2006.01)
  *G08G 1/00* (2006.01)
  *G08G 1/09* (2006.01)
  *G08G 1/16* (2006.01)

(52) U.S. Cl.
  CPC ..... *B60W 2530/14* (2013.01); *B60W 2556/50* (2020.02)

(56) References Cited

U.S. PATENT DOCUMENTS

| | | | |
|---|---|---|---|
| 7,899,610 B2 | 3/2011 | McClellan | |
| 8,134,478 B2 | 3/2012 | Denaro | |
| 8,510,200 B2 | 8/2013 | Pearlman et al. | |
| 8,554,468 B1 | 10/2013 | Bullock | |
| 8,700,255 B2 | 4/2014 | Joseph | |
| 8,825,277 B2 | 9/2014 | McClellan | |
| 8,855,915 B2* | 10/2014 | Furuhata | G08G 1/096741 701/408 |
| 8,935,036 B1 | 1/2015 | Christensen | |
| 9,457,754 B1 | 10/2016 | Christensen et al. | |
| 9,688,286 B2 | 6/2017 | Wilkes, III | |
| 10,157,422 B2* | 12/2018 | Jordan Peters | G06Q 10/04 |
| 10,217,169 B2* | 2/2019 | Schumann, Jr. | G08G 1/096775 |
| 2002/0111725 A1 | 8/2002 | Burge | |
| 2002/0194016 A1* | 12/2002 | Moribe | G08G 1/096725 701/469 |
| 2005/0075899 A1 | 4/2005 | Corcoran et al. | |
| 2006/0253307 A1 | 11/2006 | Warren et al. | |
| 2007/0239346 A1 | 10/2007 | Hawkins et al. | |
| 2009/0300035 A1 | 12/2009 | Denaro | |
| 2010/0238009 A1 | 9/2010 | Cook et al. | |
| 2011/0033830 A1 | 2/2011 | Cherian | |
| 2011/0210867 A1 | 9/2011 | Benedikt | |
| 2012/0221216 A1 | 8/2012 | Chauncey et al. | |
| 2013/0021148 A1 | 1/2013 | Cook et al. | |
| 2013/0073114 A1 | 3/2013 | Nemat-Nasser et al. | |
| 2013/0096731 A1 | 4/2013 | Tamari et al. | |
| 2013/0245880 A1 | 9/2013 | McQuade | |
| 2013/0274950 A1 | 10/2013 | Richardson et al. | |
| 2014/0195074 A1 | 7/2014 | Hunt | |
| 2014/0292539 A1 | 10/2014 | Omiya | |

\* cited by examiner

CONTEXTUAL DRIVER BEHAVIOR MONITORING

CROSS-REFERENCE TO RELATED APPLICATION

This application is a continuation of U.S. application Ser. No. 15/833,819, filed on Dec. 6, 2017, now U.S. Pat. No. 10,543,847, which is a continuation of U.S. application Ser. No. 15/250,681, filed on Aug. 29, 2016, now U.S. Pat. No. 9,849,887, which claims the benefit of U.S. Application No. 62/210,986, filed Aug. 27, 2015.

BACKGROUND

Technical Field

Driver behavior monitoring and prompting.

Description of the Related Art

Driver behavior is the leading cause of automobile crashes and modifying driver behavior is a focus of safety practitioners who implement safety programs to reduce crash rates. These efforts are of paramount importance to large fleets that are faced with the potential to lose millions of dollars in legal liabilities due to crashes caused by the drivers of their vehicles. One of the challenges to modifying driver behavior lies in the initial detection of unsafe driver behavior prior to the actuality of a crash occurrence on a driving record. Methods exist today to detect proxies for driver behavior through the monitoring of vehicle driving events such as speed (20130021148, 20130096731), hard-braking (20130096731, 20130274950), engine RPMs (20130245880), gear-shifting, lane departure warnings & roll stability activations. Other onboard event monitoring includes video capture of the driver to detect fatigue related events like nodding off, falling asleep and drowsiness. Meta-data can also be collected including weather data (20120221216) and geo-location (20130073114) information in efforts to filter out environmental factors affecting speed (bad weather, city congestion) that may skew individual vehicle event data (actual driving speed lower than average; safe driving speed lower than posted limits) that lead to faulty analysis of individual driving behavior.

Some previous work on driver behavior depends on deriving proxies for driver behavior based on onboard vehicle data inputs, and applying those proxies over a large time period and large population of drivers. Some previous work relies on an indirect association between deviations from broadly generalized averages and driver safety. Population statistics such as average speed, average gear changes, or average number of hard-braking events create baseline proxies for safe driving, and large deviations from averages are sometimes used to identify unsafe drivers for coaching. Hard braking events to avoid accidents with other vehicles cannot take into account the fault of other drivers. Drivers may drive faster on the same routes based only on the delivery schedule and whether it coincides with higher traffic volumes. All of these examples can produce data that may erroneously skew negative perceptions of a driver's safe habits when in fact the data, when taken in a fuller context, may point to the opposite. This is a potential shortcoming of uncontextualized vehicle event data being used as proxies for driver safety. It relies on the law of averages to balance out irregular sample data and highly variable conditions within population statistics without addressing the fact that individual sample data continues to be relied upon to identify high risk drivers.

Furthermore, a safety program that provides general training or coaching in response to a general comparison of individual driver behavior vs. a population of drivers fails to take into account the more powerful coaching opportunities that may be present in the moment, in the context of a specific driving decision. For example, many in-cab navigation systems will coach drivers to slow down if their speed exceeds the posted limit. This helps to remind drivers, if their attention has drifted, and also teaches drivers on regular routes about where speed limits change. With the exception of video monitoring for drowsiness, the state of the art contains little consideration of instantaneous driver coaching.

Some current methodologies often also collect vast amounts of uncontextualized data covering the entire drive time of each driver. There are large data transmission costs associated with these methodologies and they are most extreme when vehicle events include video data.

This is not to say that these methodologies are without merit, it is only to explain what may be their limitations.

BRIEF SUMMARY

There is provided in an embodiment a method of driver risk assessment, comprising maintaining a database of high risk locations, in which database each high risk location is associated with driver behaviors that are considered high risk in relation to the respective high risk location, collecting driver behavior data for a vehicle that is indicative of driver behavior at a high risk location that is included in the database, using a data collection device in the vehicle, comparing the driver behavior data to the driver behaviors considered high risk in relation to the high risk location to determine a value or values representing driver risk, and flagging a driver whose driver risk value or values exceed predetermined risk criteria.

In a further embodiment the data collection device may detect that the vehicle is approaching a high risk location of the database of high risk locations, and on the data collection device detecting that the vehicle is approaching the high risk location, may display a visual warning to the driver of the vehicle.

In a still further embodiment there is provided a method of improving driver safety, comprising maintaining a database of high risk locations, monitoring a location of a vehicle using a data collection device in the vehicle, and providing a visual warning display to a driver of the vehicle on the vehicle approaching a high risk location recorded in the database of high risk locations.

In various embodiments there may also be any one or more of the following: the visual warning display may comprise driving instructions; each high risk location recorded in the database of high risk locations may be associated with driver behaviors considered to be high risk in relation to the respective high risk location, and driver behavior data may be collected that is indicative of driver behavior at a high risk location that is included in the database using the data collection device, compared to the driver behaviors considered high risk in relation to the high risk location to determine a value or values representing driver risk, and a driver may be flagged whose driver risk value or values exceed predetermined risk criteria; each high risk location recorded in the database of high risk locations may be associated with driver behaviors considered to be high risk in relation to the respective high risk locations, and driver behavior data may be collected at the respective high risk locations, driver behavior data from vehicles whose drivers were shown the visual warning may be compared to driver behavior data from vehicles whose drivers were not shown the visual warning, the comparison being carried out with respect to the driver behaviors considered to be high risk in relation to the respective high risk locations, and on the comparison finding that the visual warnings displays are not effective at reducing driver behaviors considered high risk in relation to an accident location, the visual warning displays may be ceased to be displayed at the high risk location.

In various embodiments, the proposed method and system that implements the method, may use exception based analysis and contextualized vehicle events. Random deviations of uncontextualized vehicle events have a tenuous association with driver safety identification and must rely on the collection of many data points per individual driver to create generalized risk profiles that could otherwise be identified sooner when data is contextualized.

BRIEF DESCRIPTION OF THE SEVERAL VIEWS OF THE DRAWINGS

Embodiments will now be described with reference to the figures, in which like reference characters denote like elements, by way of example, and in which.

DETAILED DESCRIPTION

Figure 1:
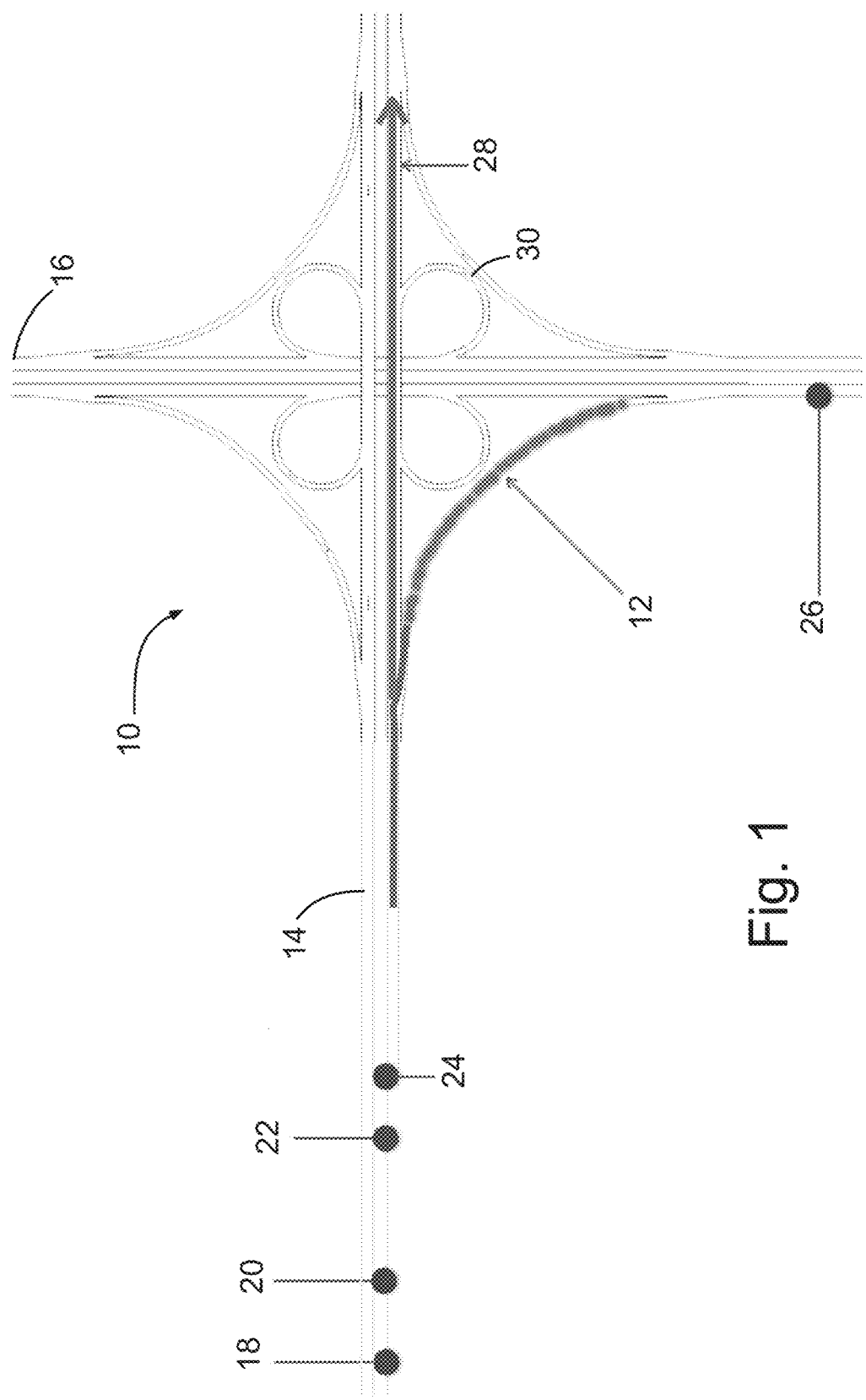
FIG. 1 is an overhead view of a highway interchange with a high-rollover exit.

Immaterial modifications may be made to the embodiments described here without departing from what is covered by the claims.

In an embodiment, the proposed method and system creates a context layer of data more closely associated with high risk driving events by collecting information on the riskiness of specific sites on the transportation network and then measuring vehicle event data at only these high risk sites. Vehicle event data is contextualized within specific risk data from the roadway including historical crash rates, road curvatures, construction or work zone events, predictive analytical data on the likelihood of a crash on the specific road segment for that moment in time and compares it to data from other drivers and onboard sensor data to accurately identify high risk driving behavior with more confidence than any methodology based on onboard sensor data only. The use of contextual data as the basis for data collection is an efficient and effective approach to identifying high risk driving events because it only collects vehicle data at specific high-risk driving locations, and it collects data that is directly indicative of relative risk. The result is much more efficient method to identify high-risk driver behavior.

Unlike averaged event data like average speed, number of gear shifts, hard braking events, etc., this approach is exception-based in an embodiment. An exception-based approach differs from a data collection, monitoring and processing tool based on universal data (always on, always collecting data) by using selective sampling (specific crash sites with known crash causalities). An embodiment of the system and method uses exception-based data collection (data only from risky locations) as the sampling basis for population statistics and therefore creates a closer link between vehicle event data and unsafe river behavior. The use of a subset of uncontextualized data targets driver behavior when it most counts and driver analysis is based on neither uncontextualized vehicle event data nor exception-based video data, but rather only data that is contextualized on the basis of the riskiness of the road at the moment the data is collected to more accurately identify unsafe driver behavior.

The pre-selected sites are preferably based on published and available crash data which provides a data overlay to the GIS-based site information (thus "contextualizing" it). Data is uncontextualized when crash data is not mapped onto GIS information and is collected continuously throughout the driving operation. Pre-scrutinized selective sampling holds advantages over universal data collection/processing systems because in principal that data is more closely associated with safety risk and practically because data volumes/transmission time/communication costs/storage sizes are materially reduced. This methodology improves upon the limits of generalized uncontextualized vehicle event data as a proxy for driver behavior because it only analyzes event data contextualized by high-risk road elements. It also improves upon exception-based video analytics methods because it does not rely solely on self-contained video-based machine-vision analytics to identify an unsafe or fatigued driver, but allows for a broader analysis of risky driver behavior that may or may not be caused by fatigue.

In another aspect, in-cab driver notifications may be used on approach to a high risk road segment, in order to raise driver awareness of the upcoming road conditions and thereby encourage a safer transit through the high risk area.

In a further aspect, rigorous A/B testing of notification variations may be carried out to find a more optimal notification strategy that improves driver outcomes. For example, compare cohorts of drivers receiving notifications 200 m, 400 m, or 600 m ahead of the risk area in order to determine which spacing produces the slowest speed through the risk area, or the fewest hard breaking exceptions, or other measures of relative safety.

In an embodiment, the proposed system and method identifies specific regions and specific risk behaviors associated with those regions, so it can effectively coach drivers to improve both their driving habits and their knowledge of risk areas on their routes. For example, a driver could be presented simple notifications of upcoming risks, recommended speed, and so on. The notification may comprise driving instructions. For example, upon entering a risky curve, drivers that have not yet slowed sufficiently could be prompted again to slow down. Another example of a possible driving instruction is a suggestion to take a break based on HOS (hours of service, as a measure of time spent driving) data exceeding a threshold.

Individual driver history may also be leveraged to modify the coaching program. For example, a driver approaching a high risk curve may be coached about the presence of the curve and the recommended maximum speed through the curve. Over time, the driver may learn about this curve, and that learning may be reflected in the driver's speed pattern through the curve. As the driver's behavior changes, the coaching program could switch to a less intrusive mode.

Conversely, a driver that continues to take a curve too quickly could be shown progressively stronger coaching messages.

All of this history of driver behavior and coaching messages can be used in aggregated reports to identify safe drivers and risky drivers, and provide further coaching or training.

A database is formed listing specific high risk sites, the database including high risk (accident causal or potentially accident causal at the specific sites) factors tied to the high risk patterns. A data collection device in a vehicle, which may be for example an electronic logging device or a mobile phone with an appropriate app installed, monitors driver behaviors at the specific sites to see if they exhibit the same specific behaviors that are considered contributing factors to specific accident types at high risk of occurrence at those sites. In an embodiment the data collection device may also contribute information to build the database.

In an embodiment, the data collection device may also passively monitor vehicle metrics such as speed, turn rate, acceleration and deceleration, and event data, in order to identify potential risk areas previously unknown in the risk area database. For example, passive monitoring may reveal a turn that has a significant statistical variance in driver responses, which may be indicative of a poorly marked or sudden sharpening of the curve. Similarly, a statistical spike in braking events near a given intersection may indicate that the intersection has poor visibility. These elements may be revealed as significant risk areas deserving of further monitoring and possibly active driver notification even though no specific crash or rollover events are recorded by law enforcement data. Where a visual warning display is provided, the visual warning display, either as a whole or specifically any driving instructions included with the display, may be modified based on or provided based on a measurement of vehicle and driver status at the time of provision of the warning display.

This section describes the process of identifying accident locations and capturing fence segments that will be used for eventual alert notification and data analysis.

Definitions

Segment: An entry or exit point on a section of road in one direction.

Path: Sequence of segments a vehicle travels.

Exit: Also referred to as entrance-ramp/on-ramp, exit-ramp/off-ramp that allows vehicles to enter or exit a controlled access highway, freeway or motorway.

Curve: Section of road when road changes direction from straight to e.g. S-curve.

Curve Center Point: the point located at the center of a curve halfway between the beginning of a curve and the end of the curve.

Ramp: A ramp is a separate travel lane that branches of off or merges into a roadway.

A database indicating locations with high risk of accident, for example crashes or rollovers, will initially be built using accident information obtained from state accident databases, accident experts and state officials. Other sources of accident information may also be used to build or improve the database, for example accident reports from users or accident information collected automatically using electronic logging devices or a cellphone app. The data collection device may also identify, for example, a high risk curve by tracking vehicle speed and turn rate through many example curves. Those curves with the highest lateral acceleration can be marked in the database as potential risk areas. An accumulation of data from many vehicles may indicate curves that are poorly marked, or unusually sharp, or where other road conditions cause drivers to consistently produce higher lateral acceleration and therefore higher relative risk of a rollover event. This method of empirically identifying risk areas may in fact produce a rich data set that is unknown to law enforcement, and for which no (relatively rare) rollover events have actually occurred. This would be especially useful in identifying risky curves in new roadways and less travelled roadways. The database may model the geographic entities representing the high risk locations. The ATRI™ high rollover database, which has database points in 32 states for 277 hot spot sites in total, may be used for example as a starting point. It is contemplated that the sites from the ATM database will be validated by state agencies and accident reporting experts before a site is identified and created as a high rollover site in the database of high risk locations, in order to ensure the accuracy and specificity of the sites. The site should identify the specific segment location, type—exit, curve, zones, and posted speed limit (if available) at the area for the trucks. In the ATM database each site is marked by a point on a map and identified by a name with the number of rollovers. Example ATRI Data point: State: Texas, Site Name: US 59/South St and US 59/SR224, Number of Rollovers: 9.

The risk sites may be entered into the system using existing Geofence technology and tools. Geofences may describe geographic regions using a variety of geometric models (enclosing polygon, proximity to a point, proximity to a roadway, direction of travel, etc.) The number of geo-fences for a site and location is left to implementation. For rollovers the site data may preserve for example:
   a. Location and specific rollover segment beginning and end
   b. Date created in the system
   c. Type of site, e.g.:
      i. Curved: Road is curved
      ii. Exit ramp: Exit on a highway
      iii. Entry ramp: Entry ramp on a highway
      iv. Straight: straight road identified as a high rollover site due to, e.g. weather conditions.
   d. Posted speed or appropriate speed limit for trucks in this zone
   e. Known historical count and duration of incidents
   f. Data variations that are specific to a vehicle type. For example, it may indicate different safe speed limits for trucks of various lengths, numbers of axles, loaded and unloaded trailers, and so on.

The geo-fences should be created to satisfy following requirements:
   a. For a geofence intended to trigger a notification for a driver, the geofence should be positioned so that notice is provided close enough to the site so driver can react smoothly, adjusting driving behavior without being so close as to create a safety risk via overreaction when already in a turn. Notifications should be close enough to the risk area so that driving behavior modification is maintained throughout the risk area.
   b. For a geofence intended to trigger measuring and recording of rollover related data, the geofence should provide triggers to start measuring and recording rollover related data at a suitable location to begin measuring and recording the data.

There is no requirement to capture data in any other path that is not identified as high rollover path. In an embodiment, a single geofence may be used to trigger both a notification for a driver and to trigger measuring and recording rollover related data. Additional geofences may be used for example to stop data collection or to trigger a notification that the driver is exiting a high rollover zone. Vehicle location may be monitored using for example GPS. Vehicle location data may be used to determine if a vehicle has entered a geofence. Vehicle speed and bearing information may also be collected, also for example using GPS. Location at which key events such as deceleration occur may also be measured. Other data such as engine bus events may also be collected, for example hard braking events or steering corrections. Other sensors may also be applied such as accelerometers or other devices that contribute environmental data. For system efficiency, data in paths other than those identified as high risk paths may be discarded at the in-cab device. In another embodiment, data may be captured continuously at the in-cab device, and a combination of heuristic algorithms and compression could be applied to extract unmapped areas of interest and transmit them to a server for further analysis.

In an embodiment, driver behavior and other sensor data may be examined in real time even outside of known risk areas. This may be implemented as a passive monitoring system whose purpose is to determine risk areas that have not previously been documented. Once identified, those new risk areas could be validated and then added to the risk database. In an embodiment, the data could be monitored continuously by the in-cab device, but only sent to the server in the event of risk-indicative conditions such as hard braking, steering corrections at speed or high lateral acceleration. In a further embodiment, transmission of the data to the server may be based on a threshold of a risk-indicative condition set below a level of the risk-indicative condition at which the condition would be of particular concern. In a still further embodiment, the data may be transmitted to the server regardless of whether a risk-indicative condition is detected.

FIG. 1 shows an example of high-level spatial timeline as a vehicle takes a high rollover exit ramp. As shown in FIG. 1, an example high rollover zone is an exit ramp 12 of an interchange 10 between a first highway 14 and a second highway 16. The exit ramp 12 in question is an exit ramp for vehicles turning right from first highway 14 to second highway 16. A data collection initial fence 18 starts data collection. A rollover notification fence 20 triggers a rollover notification to the driver. A further fence 22 might include a navigation direction, i.e. a geofence that is sensitive to the direction of travel of the vehicle. This is used to prevent traffic flowing in the wrong direction from inadvertently activating a fence (in case GPS errors make it appear that a vehicle has drifted into the fence). The driver may slow speed in response to the rollover notification. This slowing at for example location 24 is detected by the data collection. The data collection and driver notification are triggered in this example before it is possible to determine whether or not the truck will take the exit ramp 12. A further geofence 26 located after the ramp detects if the vehicle has taken the ramp and stops data collection. There may also be one or more geofences (not shown) on the ramp itself to determine if the vehicle has taken the ramp. Data collection may also be stopped by, for example, a timeout. A still further geofence 28 may also detect if the vehicle has proceeded straight along highway 14; and yet more geofences may detect if the vehicle has taken another exit ramp such as ramp 30. Note that if a driver does not take an exit benchmarking data such as speed of the truck may still be captured. This will help benchmark general population behavior near the high rollover area. However, data from drivers taking an exit should be distinguished from data from drivers not taking the exit. There may be additional rollover zones in the same intersection or nearby intersections and corresponding geofences may be provided for all such rollover zones.

Where the application is configured to display a warning message to a driver, it may display a message specific to the type of accident for which the site is high-risk, for example High Rollover or High Crash zones. If the warning message is to be displayed for an exit before it is known that the driver will take the exit, an indication may show that the warning message is for the exit. The warning message may be provided for example in the form of a visual display representing a road sign. A recognizable sound may be provided with the visual display. A reminder to slow down may be provided to the driver with the visual display. Messages may be enhanced by displaying the vehicle's current speed and/or a target speed. Follow-up messages may be shown if, for example, a driver takes a high risk curve but fails to slow on entering the curve. A further notification may be provided to the driver on leaving the high risk area.

Figure 5:
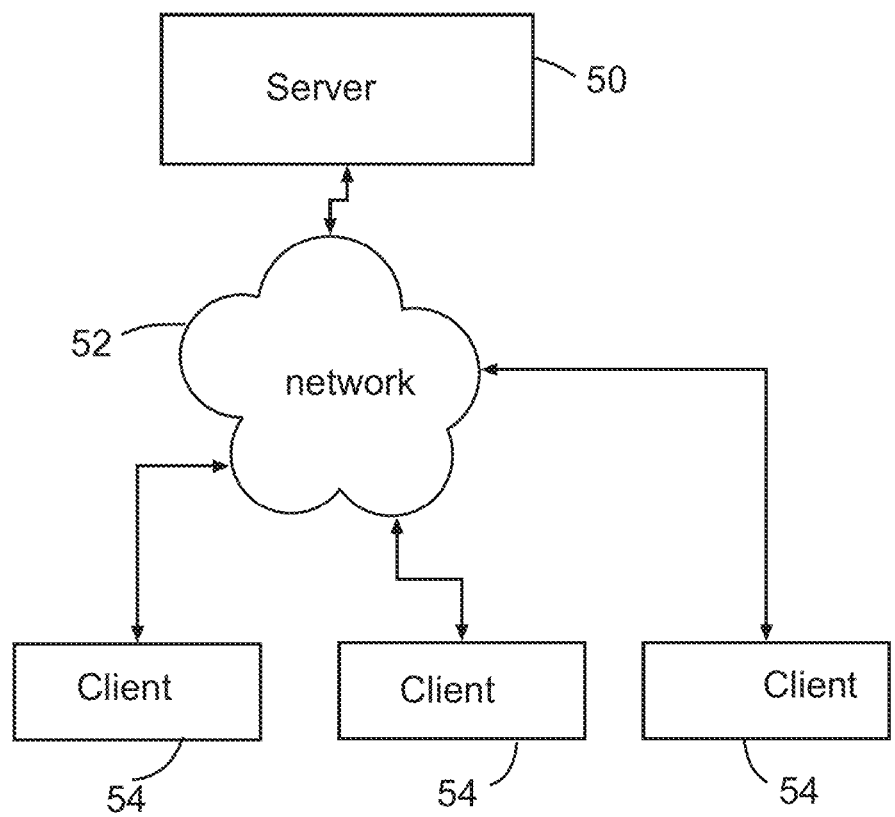
FIG. 5 shows a server communicating with multiple clients over a network.

In an embodiment, a client-server system is used with a client program in the vehicle instantiated in e.g. an application on a mobile phone or an electronic logging device platform. A server is typically in contact with all clients via a telecommunications network. The database concerning high risk locations may be maintained on the server but also synchronized to all clients. Data concerning geofences, UI descriptors and logic elements may be synchronized to a cache in the client so that the warning system may operate autonomously in case of a network issue. An extensible event-based architecture may be used that records progressively higher level semantic events (gps location, fence event, high rollover event, ui event, etc.); events span client and server components seamlessly; logic elements listen for events, process logic, and send new events. Events are delivered to the server for analysis. In an embodiment, location/Fence events drive logic on the client device. UI events may show notifications. GPS events deliver speed data to analytics logic on client. A "Risk Visit" event may deliver a summary of a visit to a high risk location and the corresponding driver reaction to the server. FIG. 5 shows a server 50 communicating with multiple clients 54 over network 52.

The system may monitor driver reaction and behavior while in the high risk area (e.g. monitor vehicle speed before and after the notification and while in the high risk region). The system may collect data concerning a visit to a high risk location, such as the vehicle, driver, location, whether and when/where a notification was given, and vehicle speed data) and transfer the data to the server for analysis. The server would collect data about each vehicle visit to a risk area. This might include, for example, the time and location of entry to and exit from the area, vehicle speed and bearing on entry and exit, a series of location, speed, and bearing data tuples through curves, braking events, and so on. All of these data elements could be collected into an aggregate "visit" record, along with specifics about the vehicle such as number of axles, length, weight, and so on. Furthermore the individual risk events or visits could be aggregated in several dimensions: by risk area, by vehicle, by driver, by vehicle type, and so on. The aggregated data could indicate statistical data such as average speed etc. Useful reporting could then be generated including, for example, fleet performance with respect to global averages, individual driver performance, listings of drivers needing further training, most problematic sites or curves, and so on.

The system may capture data that will help calibrate and benchmark accident causal driver behavior at high risk sites in the database. As the actual accident rate is generally extremely low, actual accidents are not statistically adequate to determine risk of individual drivers. Accident causal driver behavior may be used as a proxy for the discrete risk occurrence. For a high-rollover site where speed and turn radius are determined to be primary accident causal driver behavior metrics. Other factors such as load balance, center of gravity, etc. may also be determined to be influential in rollover events, and also traffic conditions and other environmental conditions. Not all of these factors may be easily measurable, so the data that is collected can be viewed as a statistical exercise against the site's determined primary crash-causal factors—e.g. looking at fleet-wide data, and comparing a significant history of events for one driver to the fleet averages. Collecting a large amount of data will help as lots of historical data will provide a smooth background against which "outlier" drivers will stand out. The system may provide a combination of real-time response and historical data. One goal of the data collection is to validate that the warning message service is affecting behavior but not causing additional problems for drivers. Analyzing the speed at the time the alert was displayed and just after should provide detail of whether there was rapid deceleration caused by hard braking. This analysis needs to be done only once; for a period of time during the introduction of the service and may be used for internal use only. Examples of such data that may be collected include:

a. Speed related data points:
 i. Average speed from beginning of curve/zone to end of curve/zone
 ii. Speed at center of curve/zone
 iii. GPS speed at configurable time before alert notification was shown to the driver. (Start at 5 seconds)
 iv. GPS speed at a configurable time after the alert notification was shown to the driver. Start with a configurable time of 5 seconds.
 v. GPS speed at high rollover and high crash zone beginning of curve/zone and end of curve/zone fences.
 vi. Maximum speed
b. Hard breaking i.e. sudden deceleration data either calculated by engine bus data if available
c. Sudden Acceleration data either calculated by engine bus data if available
d. Maximum deceleration
e. Maximum lateral acceleration (may be computed from speed and turn radius)
f. Current HOS (hours of service) available duty time
g. Actuation of vehicle roll stability system via engine bus, FMS device or FMS back office Multiple different types of notifications, training exercises etc. may be compared with one another by e.g. creating two cohorts of 500 drivers each and show a given notification to only one group. Observe any differences in driver behavior between the two cohorts. A notification type or training exercise for which better results are observed may be retained and one for which worse results are observed may be discarded.

Data collection may be carried out by an application on a data collection device, for example on an electronic logging device or mobile phone.

The application may have an option to enable/disable data capture types for sites.

The application may keep enough data to provide reporting on alert notifications (product safety—notifications stats) and driver behavior (driver risk).

The application may have an option to enable/disable notifications for each site.

The application may have an option to enable/disable notifications at specific sites for specific fleet The application may modify notification frequency and nature according to individual driver history and success in navigating the then-present risk area.

The application may modify notifications and other attributes according to vehicle type, vehicle length, number of axles, present weight, and other attributes.

The application may define following service types at the carrier (fleet) level:
 a. Rollover Analytics turn ON or OFF at fleet level: This will turn on rollover data collection at the device.
 b. Rollover Notifications turn ON or OFF at fleet level.
 c. Rollover Analytics Reporting turn ON or OFF at fleet level. This switch will turn on reporting for reporting fleet. The reports will be made available to customer via Fleet Management Portal. The Fleet Management Portal (FMP) is, for example, a web portal that allows fleet management or fleet safety personnel to log in and recall data specific to their fleet vehicles. This could also include on-demand generation of various reports. This could also include options to enable/disable features at the fleet, vehicle, or driver level.

The application may collect data to benchmark and learn driver behavior at the sites in the database, first without warning notifications. Reports may be generated in a web portal, either a purpose-built application or a general purpose reporting tool and data warehouse, or some other combination of tools. Information may be collected to assess the overall behavior tied to primary crash causal factors of the driving population through high rollover sites:
 a. Mean, standard deviation of speed
 b. Distribution of speed profiles Information may also be collected to assess the speed profile of drivers through rollover sites:
 a. Mean speed through curve/zone (Listed for example in descending order of standard distributions from mean)
 b. Speed at center of curve/zone (Listed for example in descending order of standard distributions from mean)
 c. Lateral acceleration, for example maximum lateral acceleration in a curve or zone. This may be computed from instantaneous speed and turn rate. Maximum lateral acceleration in a curve is correlated with rollover probability. (Listed for example in descending order of standard distributions from mean)
 d. A report may be generated to highlight any drivers with metrics equal or greater than 2 standard deviations ABOVE mean speed measures Data may also be collected to determine the changes in driver behavior in response to notifications of high-risk zones. For example the application may calculate average percentage reduction in center point speed and mean curve/zone speed of all drivers receiving notifications versus drivers receiving no notifications, for example the same drivers at the same locations (where data exists) prior to the implementation of the notification service (pre-notification baseline). The calculations may be carried out separately for high crash, high rollover (with curve) and high rollover (no curve) zones. This may be determined at an overall level as a system validation measure as well as to provide fleet and individual measures for the subset of the population for which notification is provided. In order to determine if notifications are causing unsafe behavior such as hard breaking after notification is presented, the application may also calculate average deceleration of vehicles based on speed data prior to and just after notification. Rapid deceleration may also be detected by monitoring engine bus data or other available sensors.

The application may analyze fleet-wide data to generate reports that may be sent to carriers via any suitable method. The reports may provide fleet-wide information concerning driver response to notifications, benchmark a fleet characteristic at an accident zone type or location, compare the fleet against industry norm, and provide a coaching report that identifies drivers who need training to improve safe driving habits at such zones. One example criterion to identify such drivers may be that the driver is consistently in top nth percentile for speed through risk areas within a cohort of similar drivers. For example, those driving a tandem dump truck will have different speed targets from those driving a delivery van or a 50' trailer. The fleet characteristic may include for example, fleet mean at center point speed and average curve/zone speed in rollover zones for all drivers receiving notifications and % change from pre-notification baseline, and fleet mean at center point speed and average curve/zone speed in rollover zones for all drivers not receiving notification. The report may also provide riskiest location alerts where a specific fleet's drivers exhibit risky driving behavior as a group more than industry-wide drivers.

The application may display the notifications specific to a site type: High Rollover or High Crash Zone. The signage may be designed to adhere to MUTCD
[Manual on Uniform Traffic Control Devices] Guidelines.

The application may also provide the ability to dismiss a notification within the current framework.

Figure 2:
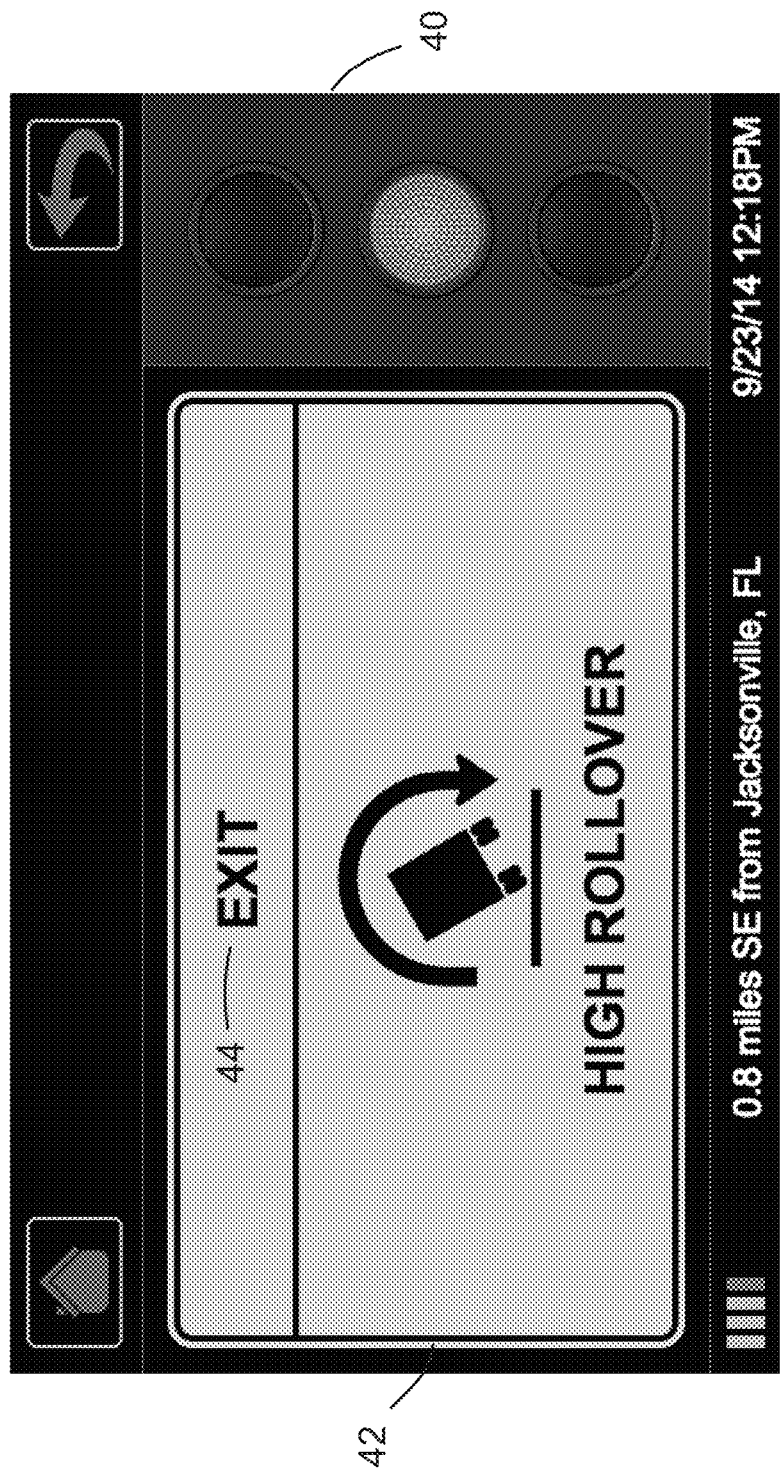
FIG. 2 shows of a rollover notification to be shown to all drivers approaching a high rollover zone at an exit ramp curve.
Figure 3:
FIG. 3 shows a notification for a high rollover zone for a straight-away zone profile.
Figure 4:
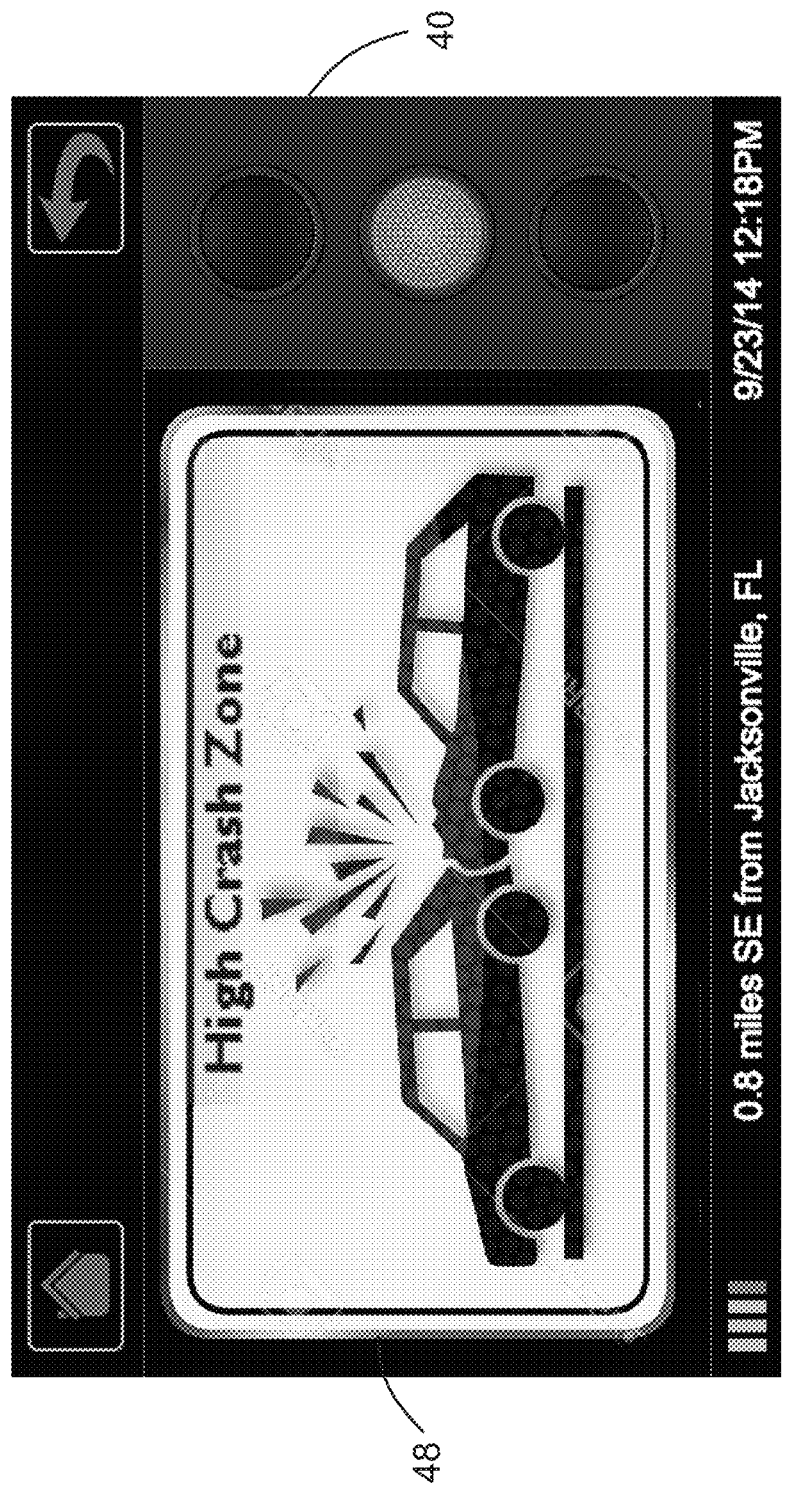
FIG. 4 shows a high crash zone notification.

For example, FIG. 2 shows a mock up of a rollover notification 42 shown on a display 40 to all drivers approaching a high rollover zone at an exit ramp curve. The EXIT notice 44 notifies drivers it is only applicable to vehicles that exit the mainline and enter the zone. It is given to all drivers in advance of whether it is known the driver will actually take the exit as it is impossible to know which drivers will take the exit ramp 3-5 seconds in advance of the exit ramp. FIG. 3 shows a mock up of a notification 46 for a high rollover zone for a straight-away zone profile. Note that there is no EXIT designation. FIG. 4 shows a mock up of a High Crash Zone notification 48.

A notification may include an indication of how long a rollover zone is, so that the driver knows when to get back to normal speeds, or an end of zone notification may be provided. Alternatively, no indication of where the zone ends may be provided, and the driver left to determine when to return to normal speeds on their own.

An audible sound may be provided with accident zone notifications to help alert drivers. The audible sound may be, for example, an audible sound used for heads up notifications.

The application may provide notifications at a configurable distance from ramp entrances. For exit lane curves the beginning of the zone may be the point of the exit ramp gore. For crash zones and high rollover zones (straightaways) the beginning of the zone may be the state defined edge or boundary of the high-crash data. Notifications may be placed 5 seconds (at posted speed limits) prior to entering the high-risk curve/zone as suggested by MUTCD or a configurable alternative distance or time before the entrance to the zone. The optimal distance or time may be determined empirically through experimentation and monitoring of driver responses. As the application may have access to actual speed data from a vehicle, the application may in an embodiment provide a notification a configurable time before the entrance to the zone according to the actual speed of the vehicle rather than speed at posted speed limits.

Notifications may be configured to be displayed for a minimum and maximum period. For example, a notification may require a minimum display time of 3 seconds, but also remain visible for longer (for example up to 10 seconds) if no other priority use of the display is requested.

Notifications may be preferably shown for a short time, e.g. 2-3 seconds, so they are not distracting and do not interfere with navigation system directions as most of these signs are near entry or exit ramps. The application may provide the capability to configure durations of notification display and distance of notification display from high-risk zones at fleet, partner and site level.

A fleet management portal may provide an interface to allow individual carriers to turn on and off the High Rollover Analytics Service, High Rollover Notification Service and High Rollover Reporting Service, and individual vehicles to turn on and off the High Rollover Analytics Service and High Rollover Notification Service. A dashboard of e.g. rollover related information for the specific carrier may also be provided, and rollover related carrier reports for the carrier.

The application may be provided on any of multiple platforms, including for example fleet management devices, navigation devices, in-vehicle systems and mobile devices.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The invention claimed is:

1. A method of driver risk assessment, comprising:
   maintaining a database of high risk locations, in which database each high risk location is associated with driver behaviors that are considered high risk in relation to the respective high risk location;
   collecting driver behavior data for a vehicle that is indicative of driver behavior at a high risk location that is included in the database, using a data collection device in the vehicle;
   comparing the driver behavior data to the driver behaviors considered high risk in relation to the high risk location to determine a value or values representing driver risk; and
   flagging a driver whose driver risk value or values exceed predetermined risk criteria;
   the method further comprising the data collection device detecting that the vehicle is approaching a high risk location of the database of high risk locations, and
   on the data collection device detecting that the vehicle is approaching the high risk location, displaying a visual warning to the driver of the vehicle, the visual warning comprising driving instructions, the driving instructions being contextually modified based on instantaneous measurement of vehicle and driver status.

2. A method of improving driver safety, comprising:
   maintaining a database of high risk locations;
   monitoring a location of a vehicle using a data collection device in the vehicle; and providing a visual warning display, comprising driving instructions, to a driver of the vehicle on the vehicle approaching a high risk location recorded in the database of high risk locations, the step of providing a visual warning display including contextual modification of the driving instructions based on instantaneous measurement of vehicle and driver status, in which each high risk location recorded in the database of high risk locations is associated with driver behaviors considered to be high risk in relation to the respective high risk location, the method further comprising the steps of:

collecting driver behavior data that is indicative of driver behavior at a high risk location that is included in the database using the data collection device;

comparing the driver behavior data to the driver behaviors considered high risk in relation to the high risk location to determine a value or values representing driver risk; and flagging a driver whose driver risk value or values exceed predetermined risk criteria.

3. The method of claim 2, comprising displaying the driving instructions based on vehicle speed exceeding a specified limit, or based on driver hours of service (HOS) data exceeding a given threshold.

4. A method of improving driver safety, comprising:

maintaining a database of high risk locations, in which each high risk location recorded in the database of high risk locations is associated with driver behaviors considered to be high risk in relation to the respective high risk location monitoring a location of a vehicle using a data collection device in the vehicle;

providing a visual warning display to a driver of the vehicle on the vehicle approaching a high risk location recorded in the database of high risk locations, the visual warning display comprising driving instructions;

modifying the driving instructions based on driver hours of service (HOS) data exceeding a given threshold, contextually modifying the driving instructions based on instantaneous measurement of vehicle status, collecting driver behavior data that is indicative of driver behavior at a high risk location that is included in the database using the data collection device;

comparing the driver behavior data to the driver behaviors considered high risk in relation to the high risk location to determine a value or values representing driver risk; and flagging a driver whose driver risk value or values exceed predetermined risk criteria.

* * * * *